United States Patent
Schneider

(10) Patent No.: US 7,780,378 B2
(45) Date of Patent: Aug. 24, 2010

(54) DEVICE AND PROCESS FOR TRANSPORTING A SLEEVE

(75) Inventor: Adam Schneider, Deggingen (DE)

(73) Assignee: Michael Hoerauf Maschinenfabrik GmbH U. Co. KG, Donzdorf (DE)

( * ) Notice: Subject to any disclaimer, the term of this patent is extended or adjusted under 35 U.S.C. 154(b) by 181 days.

(21) Appl. No.: 11/880,091

(22) Filed: Jul. 19, 2007

(65) Prior Publication Data
US 2008/0023297 A1    Jan. 31, 2008

(30) Foreign Application Priority Data
Jul. 26, 2006    (DE) .................... 10 2006 035 569

(51) Int. Cl.
B65G 53/66    (2006.01)

(52) U.S. Cl. .......................... 406/12; 269/20

(58) Field of Classification Search .............. 406/12, 406/15, 16, 19, 20, 198, 52, 157, 108, 85, 406/51, 72–74; 198/493; 414/795.5, 755; 209/644; 229/400; 269/21, 20; 493/87, 493/296, 106
See application file for complete search history.

(56) References Cited

U.S. PATENT DOCUMENTS

| | | | | |
|---|---|---|---|---|
| 2,912,282 A | * | 11/1959 | Schult | .......... 406/52 |
| 3,389,811 A | * | 6/1968 | Frank | .......... 73/45.3 |
| 3,605,573 A | * | 9/1971 | Buhle | .......... 493/278 |
| 3,709,349 A | * | 1/1973 | Buhayar et al. | .......... 198/468.4 |
| 3,907,095 A | * | 9/1975 | Russell et al. | .......... 198/407 |
| 3,915,085 A | * | 10/1975 | Lehmann | .......... 101/40.1 |
| 4,060,577 A | | 11/1977 | Collins | |
| 4,170,172 A | * | 10/1979 | Wommelsdorf | .......... 493/296 |
| 4,489,736 A | * | 12/1984 | Bolt | .......... 131/282 |
| 4,579,275 A | * | 4/1986 | Peelman et al. | .......... 229/400 |
| 4,610,655 A | * | 9/1986 | Muller | .......... 493/108 |
| 4,846,483 A | * | 7/1989 | Sorensen | .......... 279/3 |
| 5,393,292 A | * | 2/1995 | Sand | .......... 493/76 |
| 2008/0280743 A1 | * | 11/2008 | Stahlecker et al. | .......... 493/106 |

FOREIGN PATENT DOCUMENTS

DE    32 03 396 A1    8/1983
EP    1 284 848 B1    2/2003

OTHER PUBLICATIONS

German Patent Office Search Report dated Dec. 1, 2006 (4 pages).

* cited by examiner

*Primary Examiner*—Gene Crawford
*Assistant Examiner*—William R Harp
(74) *Attorney, Agent, or Firm*—Flynn, Thiel, Boutell & Tanis, P.C.

(57) ABSTRACT

A device and a process for transporting a sleeve, in particular for a cup or a can, in which the sleeve is transported during the production process from a first working station to a second working station. The sleeve is transported by a blast of air, whereby the blast of air is generated in the opposite direction to the transport direction of the sleeve. A first working station comprises a mandrel for taking up the sleeve. An air jet is provided for creating the blast of air, the mouthpiece of the air jet being directed towards the mandrel in the opposite direction to the transport direction of the sleeve.

21 Claims, 1 Drawing Sheet

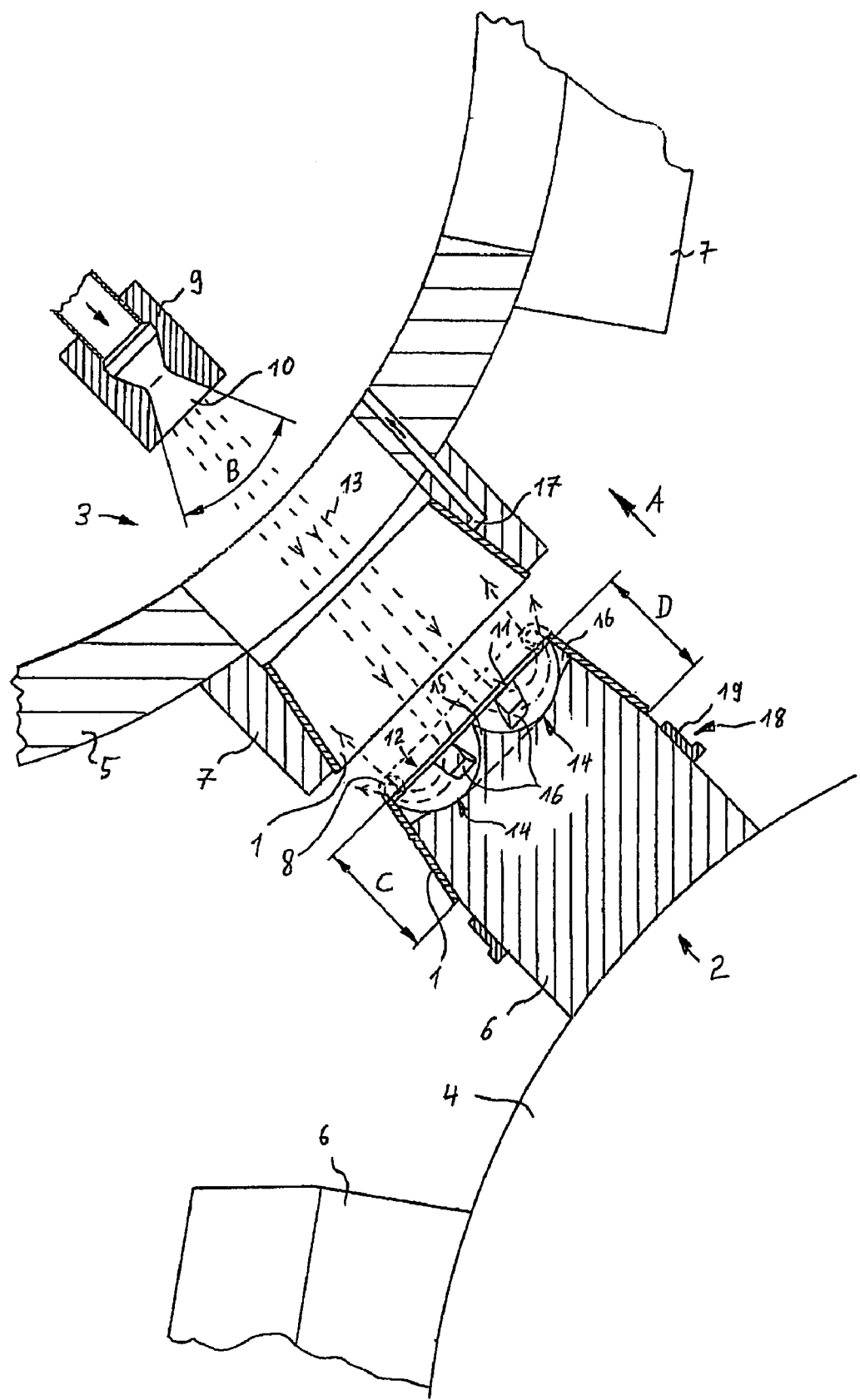

DEVICE AND PROCESS FOR TRANSPORTING A SLEEVE

BACKGROUND AND SUMMARY OF THE INVENTION

The present invention relates to a device and a process for transporting a sleeve, in particular for a cup or a can, in which the sleeve is transported during the production process from a first working station to a second working station. The present invention relates further to a device for carrying out the process, whereby the first working station comprises a mandrel for taking up the sleeve.

In production arrangements and machines for producing cups or cans from paper, paper board, synthetic or composite material, an essentially cylindrical or conical sleeve is formed from a flat blank, which sleeve then forms the wall of a cup or can. The sleeve can be made by means of wrapping the blank on a mandrel and joining the ends of the blank. In this stage the sleeve is still open at both ends. If required, a lid or a bottom are applied at a later stage.

In order to transfer the double open-ended sleeve from the mandrel of the first working station to the second working station it may be necessary to remove the sleeve from the mandrel in axial direction. In the known devices and machines, the transport takes place by means of mechanical transporting elements, for example in the form of grippers. The mechanical transporting elements have hereby the disadvantage in that the achievable cycle time cannot be optionally shortened due to the increasing inertia forces. The production speed of the known production arrangements is thus limited.

It is an object of the present invention to create a process and a device for transporting a sleeve in which mechanical transport elements for the sleeve can be omitted.

This object has been achieved according to the process of the present invention in that the sleeve is transported by means of an air blast, whereby the air blast is generated in the opposite direction to the transport direction of the sleeve. In the case of the device, the object has been achieved in that an air jet comprising a mouthpiece is provided, whereby the mouthpiece is directed towards the mandrel in the opposite direction to the transport direction.

By means of an air blast directed against the transport direction, the sleeve can be reliably transported, parallel to the axis of the sleeve, from the first working station to the second working station without the need for mechanical transport elements.

It is advantageous to create, by means of the air jet, a pulse-like air blast, which lasts less than a second, in particular less than 0.2 seconds. It can be advantageous to deflect the air blast, at least partly, in the area of the first working station. Means for guiding the air blast can be arranged to the mandrel for this purpose, which means deflect the air blast, blowing in the opposite direction to the transport direction, to at least some extent laterally and/or in transport direction, when the sleeve is being transported. The said means for guiding the air blast can, for example, be formed by the plane front surface of the mandrel. In an advantageous embodiment of the present invention, the means for guiding the air blast could also comprise at least one pocket-shaped recess or at least one concave surface on the mandrel.

BRIEF DESCRIPTION OF THE DRAWINGS

These and further objects, features and advantages of the present invention will become more readily apparent from the following detailed description thereof when taken in conjunction with the accompanying drawing.

The only FIGURE shows an intersectional view of a schematic and only partly shown production arrangement for a cup or a can in an area, in which a sleeve 1 is transported during the production process from a first working station 2 to a second working station 3 in transport direction A. For the sake of clarity, a sleeve 1 is drawn in both working stations 2 and 3. Both sleeves 1 actually represent one and the same sleeve 1 at different points in time, namely one before the transport process and one thereafter.

The production arrangement can comprise as essential component parts two star-shaped wheels 4 and 5, on whose circumference a number of mandrels 6 and take-ups 7 for the sleeve 1 are applied. The wheels 4, 5 are drivable in cycles, and are rotated to the relevant degree in each working cycle, so that the respective next mandrel 6 and the next take-up 7 reaches the area of the working station 2 and 3.

The sleeve 1 is formed in the station upstream of the working station 2, in that the flat blank, for example made from paper material, is wrapped around the mandrel 6 and joined to a sleeve 1 lengthwise on the mandrel 6. The completed sleeve 1, which is open on both front ends and does not comprise either a lid or a bottom, is transported from the working station 2 to the working station 3. As an option, the sleeve 1 can comprise an inwardly rolled curled part, which is denoted in the FIGURE by a broken line and with the reference number 8.

The sleeve 1 is advantageously used as the outer sleeve for a double-walled insulating cup or for example a composite cup having a synthetic inner cup. The inner cup is inserted into the sleeve 1 in one of the working stations downstream of working station 3 and attached to the sleeve. Alternatively it can also be provided that, after the transfer to the working station 3, a second inwardly rolled curled part is applied to the sleeve 1 or that a lid or a bottom element is inserted into the sleeve 1. In contrast to the shown conical sleeve 1, the sleeve can also be essentially cylindrical.

It is provided in the present invention that the sleeve 1 is transported from the working station 2 to the working station 3 by means of an air blast, whereby the air blast is generated in the opposite direction to the transport direction A of the sleeve 1. An air jet 9 is provided for the purpose of generating the air blast, said air jet 9 comprising a mouthpiece 10. The mouthpiece 10 of the air jet 9 is directed at the mandrel 6 in the opposite direction to the transport direction A of the sleeve 1. It is advantageous to apply the air jet 9 coaxially to the mandrel 6, so that the mouthpiece 10 is directed perpendicularly to the face surface 11 of the mandrel 6. The face surface 11 of the mandrel 6 acts hereby as the means 12 for guiding the air blast, via which means 12 the air blast is deflected to an extent in the area of the first working station 2. The flow pattern of the air blast is denoted by broken lines and the reference number 13.

The air blast is generated advantageously by subjecting the air jet 9 to compressed air for a short a time as possible. It is advantageous that the air blast is short and pulse-like, and lasts for less than a second, and in particular for less than 0.2 seconds. The application of a short and strongest possible air blast results in the reliable and rapid transport of the sleeve 1 from the mandrel 6 to the take-up 7.

The choice of air jet 9 for generating the air blast is, in principle, optional. In order to achieve good transport results with concurrent low levels of noise emanating from the air jet, an air jet has proven advantageous which comprises in the area of its mouthpiece 10 an exit angle B of between 5° and 70°, in particular between 15° and 55°. Particularly advantageous is an air jet 9 in the form of a Laval jet.

The distance over which a sleeve 1 must be transported by the air blast depends on the height C of the sleeve 1 and on the distance between the mandrel 6 and the take-up 7. The distance between the working station 2 and the working station 3 can lie in the range between 20 mm and 30 mm. The transport path for the sleeve 1 thus measures a sum above the sleeve height C. As the height can differ greatly in the case of sleeves 1 for different cups, it can be advantageous to vary the means 12 for guiding the air blast, and to adapt the transport effect of the air blast to requirements. Sleeve heights C in the industry lie in the order of magnitude between 40 mm and 200 mm. It can be advantageous when the means 12 for guiding the air blast comprise at least one concave surface 14 in order to improve the transport effect of the air blast. The concave surface 14 in the area of the front side 11 of the mandrel 6 can hereby have the form of the surface of an annular ring as shown in the FIGURE, so that a tip 15 projecting in transport direction A arises in the centre of the mandrel 6. In an embodiment not shown the concave surface 14 can be so designed that a tip 15 does not occur.

The length D of the mandrel 6 serving as the take-up for the sleeve 1 can be designed in different ways in relation to the sleeve height C. Even in the case of sleeves 1 without an inwardly rolled curled part 8, the length D can also be shorter than the sleeve height C, so that the sleeve 1 projects out over the face surface 11 of the mandrel 6. This is advantageous as the sleeve 1 presents the air blast with a good contact surface, and can be transported very reliably to the working station 3.

If for production reasons it is necessary that the length D of the mandrel 6 serving to take up the sleeve 1 corresponds approximately to the sleeve height C, or is even greater, it can be advantageous that the means 12 for guiding the air blast comprise at least one pocket-shaped recess 16, which is arranged in the front side surface 11 or in the concave surface 14 of the mandrel 6. A number of pocket-shaped recesses 16 are advantageously distributed on the circumference of the face surface 11, so that the air blast can target a sufficiently large contact surface on the sleeve 1.

As the air blast for transporting the sleeve 1 is only of a very short duration, it can be advantageous that means 17 for holding the arriving sleeve 1 are provided at the second working station 3. The means 17 do not contribute to the transport of the second working station 3. The means 17 do not contribute to the transport of the sleeve 1 into the take-up 7, they serve only to fix the sleeve 1 as soon as it arrives at the take-up 7. The means 17 for holding the sleeve 1 can be realized for example by a number of bore holes in the take-up 7, which bore holes are subject to a slight vacuum. The holding means 17 prevent the sleeve 1 from slipping when the air blast stops. This is in particular advantageous if the transport direction A is directed vertically upwards, and the sleeve 1 tends to slip out of the take-up 7 again in the opposite direction to the transport direction A due to the force of gravity.

In a further embodiment of the invention it can be advantageous that the sleeve 1 is slightly loosened in its take-up in the first working station 2 before the air blast is generated. An ejector 18, for example in the form of a ring 19 slideable in axial direction of the mandrel 6, can be assigned to the mandrel 6 of the working station 2 for the purpose of loosening the sleeve 1. Shortly before the air blast is generated, the ejector 18 can move slightly in transport direction A and by means of its ring 19 push the sleeve 1 minimally in transport direction A by a few millimetres. Depending on the how tight the blank is wrapped around the mandrel 6 during production of the sleeve 1, a loosening of the sleeve 1 by the ejector 18 can be necessary in order that the sleeve 1 can be transported further by the air blast.

The invention claimed is:

1. A process for transporting a sleeve for a cup or a can comprising:
   transporting the sleeve during a production process from a first working station to a second working station by generating an air blast oriented coaxially with respect to the sleeve and in a direction substantially parallel with, and in an opposite direction to, a transport direction of the sleeve.

2. A process according to claim 1, including deflecting the air blast in an area of the first working station, at least to an extent.

3. A process according to claim 1, including slightly loosening the sleeve in its take-up from the first working station before the air blast is generated.

4. A process according to claim 1, including generating the air blast in less than one second.

5. A process according to claim 4, including generating the air blast in less than 0.2 seconds.

6. A process according to claim 1, including transporting the sleeve by the air blast over a distance greater than a sleeve height.

7. A device for transporting a sleeve for a cup or a can, comprising:
   a first working station comprising a mandrel for holding the sleeve; and
   an air jet arranged coaxially with the mandrel and comprising a mouthpiece, the mouthpiece being directed at the mandrel, the air jet being disposed to generate an air blast through the mouthpiece in a direction substantially parallel with, and in an opposite direction to, a transport direction of the sleeve.

8. A device according to claim 7, wherein the air jet is a Laval jet.

9. A device according to claim 7, wherein the mouthpiece defines an exit angle of between 5° and 70°.

10. A device according to claim 9, wherein the exit angle of the mouthpiece is between 15° and 55°.

11. A device according to claim 7, and further comprising a holder for the sleeve at the second working station.

12. A device according to claim 7, wherein the mandrel has an outer surface, and an ejector for loosening the sleeve from the mandrel is attached to the outer surface of the mandrel.

13. A mandrel for taking up a sleeve by being at least partially inserted into the sleeve in a production arrangement, wherein the mandrel is configured for partial insertion into an interior of the sleeve and comprises means for guiding an air blast during transport of the sleeve.

14. A mandrel according to claim 13, wherein the mandrel has a face at a distal end of the mandrel, and the mandrel face comprises the means for guiding the air blast, which comprises at least one pocket-shaped recess.

15. A mandrel according to claim 13, wherein the mandrel has a face at a distal end of the mandrel, and the mandrel face comprises means for guiding the air blast, which comprises at least one concave surface.

16. A mandrel according to claim 13, wherein the length of the mandrel for taking up the sleeve is less than a sleeve height.

17. A device for transporting a sleeve defining a longitudinal axis comprising:
   a first work station comprising a mandrel, around which a sleeve may be disposed;

a second work station adjacent the first work station, the second work station comprising a take-up member, on which a sleeve may be temporarily supported; and an air jet adjacent the mandrel, the air jet being adapted to direct an air blast in a first direction, the first direction being substantially coaxial with respect to the longitudinal axis of a sleeve, and in substantially the opposite direction as the direction of transportation of the sleeve from the first work station to the second work station.

18. The device of claim 17, wherein the mandrel includes a surface disposed adjacent the take-up member, the surface defining therein an air-deflecting recess disposed to receive the air blast from the air jet and change the direction of the air blast.

19. The device of claim 18, wherein the air-deflecting recess is a concave surface.

20. The device of claim 18, wherein the air-deflecting recess is a pocket-shaped recess.

21. The device of claim 18, wherein the air-deflecting recess is configured to change the direction of the air blast and direct the air blast onto the sleeve to move the sleeve from the first work station to the second work station.

* * * * *